United States Patent
Ishimoto et al.

(10) Patent No.: US 6,845,411 B2
(45) Date of Patent: Jan. 18, 2005

(54) EXTERNAL STORAGE DEVICE, CONTROL DEVICE, EXTERNAL STORAGE SYSTEM, CONTROL METHOD, PROGRAM, AND RECORDING MEDIUM

(75) Inventors: Takeshi Ishimoto, Kawasaki (JP); Tohru Sumiyoshi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 10/345,660

(22) Filed: Jan. 16, 2003

(65) Prior Publication Data

US 2003/0135671 A1 Jul. 17, 2003

(30) Foreign Application Priority Data

Jan. 17, 2002 (JP) ........................................ 2002-009264

(51) Int. Cl.$^7$ ................................................ G06F 13/00
(52) U.S. Cl. ............................ 710/31; 710/62; 710/72; 710/74
(58) Field of Search ............................ 710/31, 62, 72, 710/74; 711/111–114; 714/42–44, 48, 5

(56) References Cited

U.S. PATENT DOCUMENTS

| | | | | |
|---|---|---|---|---|
| 5,922,077 A | * | 7/1999 | Espy et al. | ...................... 714/7 |
| 5,991,891 A | * | 11/1999 | Hahn et al. | ...................... 714/4 |
| 6,038,618 A | * | 3/2000 | Beer et al. | ...................... 710/18 |
| 6,055,228 A | * | 4/2000 | DeKoning et al. | ........... 370/258 |
| 6,128,750 A | * | 10/2000 | Espy et al. | ...................... 714/7 |
| 6,356,984 B1 | * | 3/2002 | Day et al. | .................... 711/147 |
| 6,466,540 B1 | * | 10/2002 | Emberty et al. | ............. 370/222 |
| 6,504,817 B2 | * | 1/2003 | Oldfield et al. | .............. 370/217 |
| 2001/0011357 A1 | * | 8/2001 | Mori | ........................... 714/25 |
| 2001/0014956 A1 | * | 8/2001 | Nagata et al. | ................. 714/8 |

OTHER PUBLICATIONS

"Designing Storage Area Networks: A Practical Reference for Implementing Fibre Channel SANs", Clark, Thomas, Pearson Education, Sep. 1999.

* cited by examiner

*Primary Examiner*—Fritz Fleming
(74) *Attorney, Agent, or Firm*—Randall J. Bluestone; Harrington & Smith, LLP (57) ABSTRACT

An external storage device including first and second input/output units for performing input/output of information from/to an outside, a plurality of storage units connected between the first and second input/output units so that a transmission path of information forms a series connection, and a configuration control unit. The configuration control unit selects two adjacent units from the first input/output unit, each of the plurality of storage units, and the second input/output unit to set a boundary between the two units. Thus the configuration control unit causes the storage units located on a first input/output unit side of the boundary to communicate with the outside by using the first input/output unit and causes the storage units located on a second input/output unit side of the boundary to communicate with the outside by using the second input/output unit.

20 Claims, 6 Drawing Sheets

EXTERNAL STORAGE DEVICE, CONTROL DEVICE, EXTERNAL STORAGE SYSTEM, CONTROL METHOD, PROGRAM, AND RECORDING MEDIUM

BACKGROUND OF THE INVENTION

The present invention relates to an external storage device, a control device, an external storage system, a control method, a program, and a recording medium. Specifically, the present invention relates to an external storage device, a control device, an external storage system, a control method, a program, and a recording medium, which perform failure recovery control.

In a mode in which an external storage device is connected to a plurality of hubs, a networking model has been proposed (Thomas Clark, "Designing Storage Area Networks: A Practical Reference for Implementing Fibre Channel SANs," Pearson Education, 09/1999). In the networking model, when a failure occurs in communications between the external storage device and one of the hubs, a host computer communicates with a disk device inside the external storage device through the other hubs.

However, if the external storage device is enabled to communicate through a plurality of hubs, respective usage rates of data streams are lowered. As a result, a ratio of costs to traffic is increased.

SUMMARY OF THE INVENTION

Accordingly, it is an object of the present invention to provide an external storage device, a control device, an external storage system, a control method, a program, and a recording medium, which can solve the above described problem. The object is achieved by combinations of features described in the independent claims in the appended claims. The dependent claims define further advantageous concrete examples of the present invention.

Specifically, according to a first aspect of the present invention, provided are an external storage device including: first and second input/output units for performing input/output of information from/to an outside; a plurality of storage units connected between the first input/output unit and the second input/output unit so that a transmission path of information forms a series connection; and a configuration control unit for selecting two adjacent units from the first input/output unit, each of the plurality of storage units, and the second input/output unit to set a boundary between the two adjacent units, thus causing the storage units located on a first input/output unit side of the boundary to communicate with the outside by using the first input/output unit and causing the storage units located on a second input/output unit side of the boundary to communicate with the outside by using the second input/output unit, an external storage system including the external storage device, and a control device for controlling the external storage device. Moreover, the present invention provides a control method and a program for controlling the external storage device, and a recording medium on which the program is recorded.

Note that, in the above described summary of the present invention, all features required for the present invention are not enumerated. Subcombinations of these features may also be included in the present invention.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Hereinafter, the present invention is described through an embodiment of the invention. However, the embodiment is not intended to limit the invention according to the accompanying claims. All combinations of features described in the embodiment are not always required for solving means according to the invention.

Figure 1:
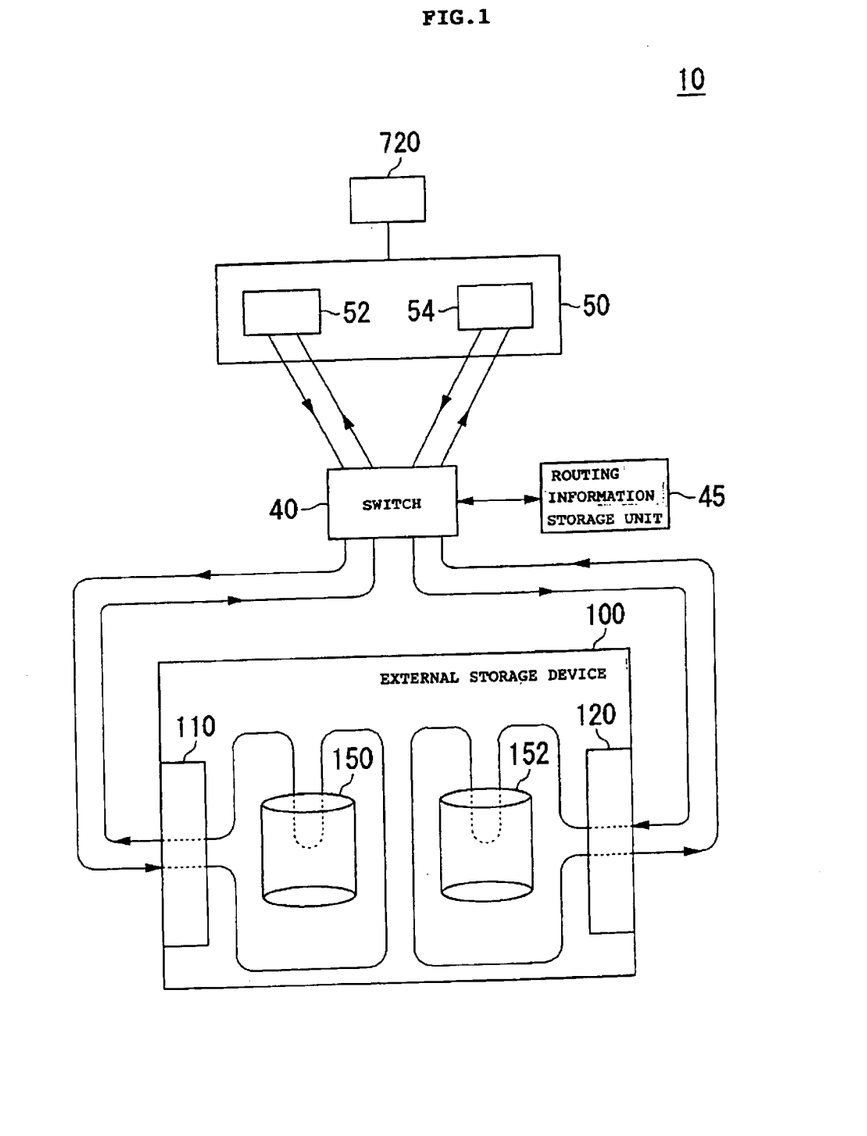
FIG. 1 is a schematic view of an external storage system 10.

FIG. 1 is a schematic view of an external storage system 10. The external storage system 10 includes a switch 40, a routing information storage unit 45, a host computer 50, and an external storage device 100. The external storage device 100 has a first input/output unit 110, a second input/output unit 120, and first and second hard disk drives 150 and 152 being examples of storage units according to the present invention. The host computer 50 has a first host bus adapter 52 and a second host bus adapter 54. Note that, though the routing information storage unit 45 is provided outside both the switch 40 and the host computer 50 in FIG. 1, the routing information storage unit 45 may be provided inside either the switch 40 or the host computer 50.

The first input/output unit 110 and the second input/output unit 120 of the external storage device 100 are connected to the host computer 50. More specifically, the first host bus adapter 52, the second host bus adapter 54, the first input/output unit 110, and the second input/output unit 120 are each connected to the switch 40 by a data stream for input and a data stream for output. The first hard disk drive 150 and the second hard disk drive 152 are respectively connected to the first input/output unit 110 and the second input/output unit 120 inside the external storage device 100 through respective data streams for input and respective data streams for output. The host computer 50 is connected to a network 720.

When the host computer 50 accesses the first hard disk drive 150 or the second hard disk drive 152, which stores targeted data, the host computer 50 uses the input/output unit specified by using routing information stored in the routing information storage unit 45. For example, when access to the first hard disk drive 150 is expected, the host computer 50 uses the first input/output unit 110 specified by using the routing information. Thus the host computer 50 accesses the first hard disk drive 150 through either the first host bus adapter 52 or the second host bus adapter 54. In this case, the first host bus adapter 52 and the second host bus adapter 54 are connected to the switch 40 through the respective data streams independent of each other. Accordingly, the host computer 50 can access the first hard disk drive 150 and the second hard disk drive 152 in parallel, respectively.

The routing information storage unit 45 updates the routing information stored therein, when the routing information storage unit 45 receives notification that either the first hard disk drive 150 or the second hard disk drive 152 is newly connected to either the first input/output unit 110 or the second input/output unit 120.

Incidentally, when the routing information storage unit 45 is provided inside the host computer 50, the switch 40 performs as static routing. The host computer 50 specifies the input/output unit by coordination between a device inside the host computer 50 and the routing information storage unit 45, and accesses either the first hard disk drive 150 or the second hard disk drive 152. On the other hand, when the routing information storage unit 45 is provided inside the switch 40 or when the routing information storage unit 45 is provided outside the switch 40 as a distinct entity, the host computer 50 accesses either the first hard disk drive 150 or the second hard disk drive 152 through the input/output unit specified by using routing function of the switch 40.

When communications through the first input/output unit 110 and the second input/output unit 120 are normal, the external storage device 100 connects the first hard disk drive 150 and the second hard disk drive 152 with the first input/output unit 110 and the second input/output unit 120, respectively. Thus loads on the data streams are dispersed to realize high speed communications. On the other hand, when the communications through either the first input/output unit 110 or the second input/output unit 120 come to be not normal, both the first hard disk drive 150 and the second hard disk drive 152 are connected to the normal one between the first input/output unit 110 and the second input/output unit 120, thus avoiding a communication failure to maintain access paths to both the first hard disk drive 150 and the second hard disk drive 152. In this way, the external storage device 100 can recover communications with the outside in the event of a failure.

Figure 2:
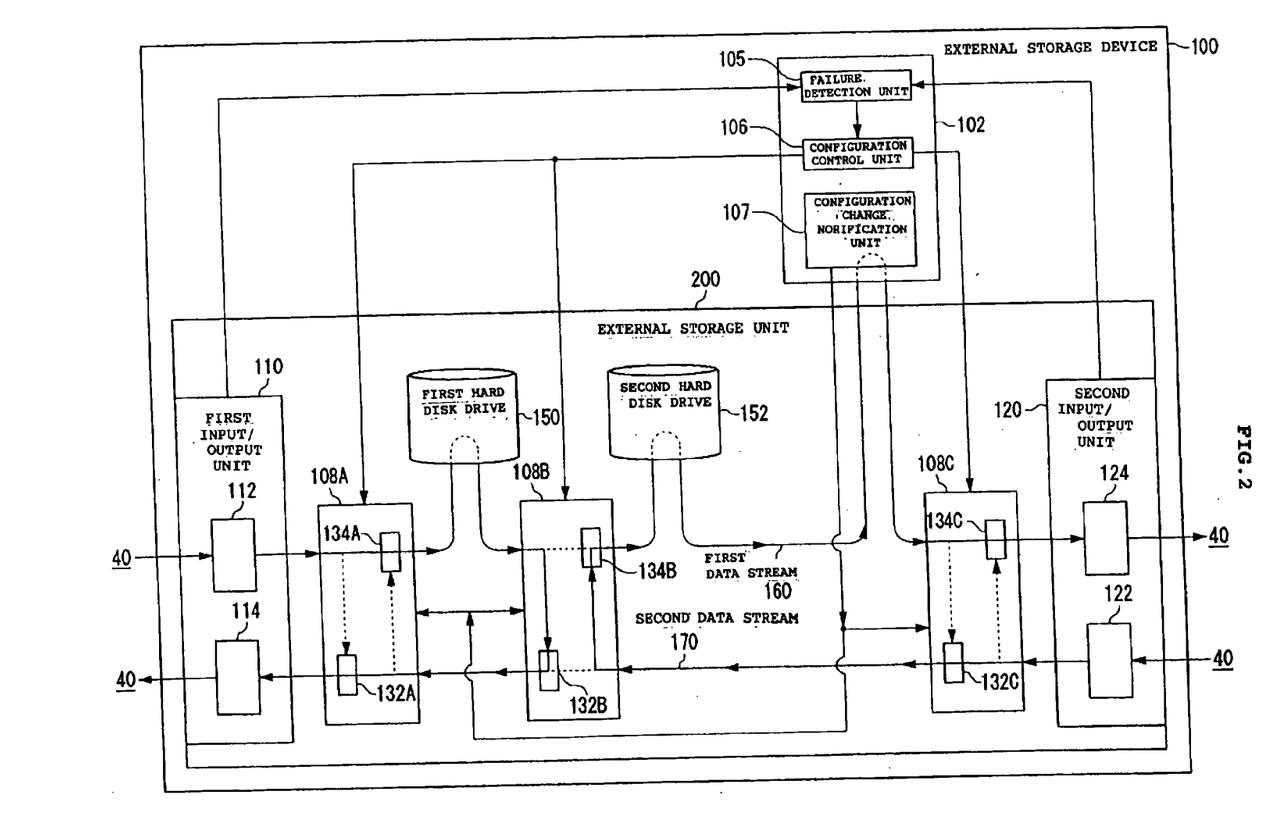
FIG. 2 is a block diagram showing functions of an external storage device 100.

FIG. 2 is a block diagram showing functions of the external storage device 100. The external storage device 100 includes a control device 102 and an external storage unit 200. The external storage unit 200 has selector units 108A to 108C, the first input/output unit 110, the second input/output unit 120, the first hard disk drive 150, the second hard disk drive 152, a first data stream 160, and a second data stream 170. The control device 102 has a configuration change notification unit 107, a failure detection unit 105, and a configuration control unit 106. The selector units 108A to 108C have first selectors 132A to 132C and second selectors 134A to 134C, respectively. The first input/output unit 110 has a first input port 112 and a first output port 114. The second input/output unit 120 has a second input port 122 and a second output port 124.

The first input/output unit 110, the selector unit 108A, the first hard disk drive 150, the selector unit 108B, the second hard disk drive 152, the control device 102, the selector unit 108C, and the second input/output unit 120 are connected to each other in this order so that a transmission path of information forms a series connection, thus forming the first data stream 160. The second input/output unit 120, the selector unit 108C, the selector unit 108B, the selector unit 108A, and the first input/output unit 110 are connected to each other in this order so that a transmission path of information forms a series connection, thus forming the second data stream 170. The control device 102 is further connected to the first input/output unit 110, the second input/output unit 120, and the selector units 108A to 108C.

The first input/output unit 110 and the second input/output unit 120 perform input/output of information from/to the outside. Specifically, the first input port 112 and the second input port 122 receive information from the switch 40. Meanwhile, the first output port 114 and the second output port 124 transmit information to the switch 40.

Moreover, the first input/output unit 110 and the second input/output unit 120 transmit respective communication states of the first input/output unit 110 and the second input/output unit 120 to the failure detection unit 105 in order to cause the failure detection unit 105 to detect a communication failure. Here, the respective communication states of the first input/output unit 110 and the second input/output unit 120 may be information as to whether the first input/output unit 110 and the second input/output unit 120 are communicating or not, error rates in communications, or timeout frequencies in communications, for example.

The selector unit 108A is set to a loop-back mode or a pass-through mode by the configuration control unit 106. When the selector unit 108A is set to the loop-back mode, the first selector 132A turns back information transmitted from the first data stream 160 to transmit the information to the second data stream 170, and the second selector 134A turns back information obtained from the second data stream 170 to a position closer to the second input/output unit 120 than a position where the first selector 132A obtains the information from the first data stream 160 on the first data stream 160.

When the selector unit 108A is set to the pass-through mode, the first selector 132A transmits information transmitting on the second data stream 170 to the second data stream 170 without change, and the second selector 134A transmits information transmitting on the first data stream 160 to the first data stream 160 without change.

Also in the selector units 108B and 108C, since outlines of operations are same as the foregoing, a description thereof will be omitted.

Incidentally, in FIG. 2, since the selector unit 108B is set to the loop-back mode, the first hard disk drive 150 is connected to the first input/output unit 110 and the second hard disk drive 152 is connected to the second input/output unit 120. In FIG. 2, respective paths to which the first hard disk drive 150 and the second hard disk drive 152 are connected, that is, a path from the first input/output unit 110 to the first input/output unit 110 via the first hard disk drive 150 and a path from the second input/output unit 120 to the second input/output unit 120 via the second hard disk drive 152, are shown by solid lines.

As described above, by setting one of the selector units 108A to 108C to the loop-back mode, it is possible to form a path from the first input port 112 to the first output port 114 through the selector unit set to the loop-back mode, and to form a path from the second input port 122 to the second output port 124 through the selector unit set to the loop-back mode.

The failure detection unit 105 receives states of communications with the outside through the first input/output unit 110 and the second input/output unit 120, from the first input/output unit 110 and the second input/output unit 120. The failure detection unit 105 then detects failures in the communications with the outside through the first input/output unit 110 and the communications with the outside through the second input/output unit 120, and transmits a result of the detection to the configuration control unit 106.

Here, as a failure in the communications with the outside, the failure detection unit 105 may detect a breakdown of the first input/output unit 110 or the second input/output unit 120 itself, a breakdown of either the switch 40 connected to each of the first input/output unit 110 and the second input/output unit 120 or another external storage device 100, or a disconnection of a data stream from either the first input/output unit 110 or the second input/output unit 120 to an external device, for example. Alternatively, the failure detection unit 105 may detect excesses of either respective error rates or respective timeout frequencies in the communications through the first input/output unit 110 and the second input/output unit 120 over a reference value set in a device.

When the failure detection unit 105 does not detect a communication failure of the first input/output unit 110 and the second input/output unit 120, the configuration control unit 106 sets the selector unit 108A, the selector unit 108B, and the selector unit 108C to the pass-through mode, the loop-back mode, and the pass-through mode, respectively. Thus the first hard disk drive 150 and the second hard disk drive 152 are connected to the first input/output unit 110 and the second input/output unit 120, respectively.

Meanwhile, when the configuration control unit 106 receives a result which shows that a communication failure of the first input/output unit 110 is detected from the failure detection unit 105, the configuration control unit 106 sets the selector unit 108A, the selector unit 108B, and the selector unit 108C to the loop-back mode, the pass-through mode, and the pass-through mode, respectively. Thus all the hard disk drives are connected to a path from the second input port 122 to the second output port 124.

Similarly, when the configuration control unit 106 receives a result which shows that a communication failure of the second input/output unit 120 is detected from the failure detection unit 105, the configuration control unit 106 sets the selector unit 108A, the selector unit 108B, and the selector unit 108C to the pass-through mode, the pass-through mode, and the loop-back mode, respectively. Thus all the hard disk drives are connected to a path from the first input port 112 to the first output port 114.

When there is a change in hard disk drives connected to either the first input/output unit 110 or the second input/output unit 120, the configuration change notification unit 107 notifies the routing information storage unit 45 that there is the change in the hard disk drives connected to either the first input/output unit 110 or the second input/output unit 120. Specifically, when the configuration control unit 106 changes a path to which either the first hard disk drive 150 or the second hard disk drive 152 is connected, the configuration change notification unit 107 outputs information that the path to which either the first hard disk drive 150 or the second hard disk drive 152 belongs is changed, to the first data stream 160. The routing information storage unit 45 receives a notification that the path is changed, through the second input/output unit 120. In FIG. 2, the foregoing process will be described while citing a case where the first hard disk drive 150 is newly connected to the second input/output unit 120 as an example. As an initial state, it is assumed that the selector unit 108A, the selector unit 108B, and the selector unit 108C are respectively set to the pass-through mode, the loop-back mode, and the pass-through mode. When the selector unit 108B is set to the pass-through mode and the selector unit 108A is set to the loop-back mode, the first hard disk drive 150 is newly connected to the second input/output unit 120. Accordingly, the configuration change notification unit 107 notifies the routing information storage unit 45 of information that the first hard disk drive 150 is newly connected to the second input/output unit 120, through the second input/output unit 120.

Moreover, in order to notify a device connected to a path to which the configuration change notification unit 107 is not directly connected that the paths to which the first hard disk drive 150 and the second hard disk drive 152 are connected are changed, the configuration change notification unit 107 temporarily disconnects part of the first data stream 160 and the second data stream 170. Specifically, the configuration change notification unit 107 transmits instructions to temporarily disconnect the data streams to the selector units 108A to 108C. On receiving the instructions to temporarily disconnect the data streams, the selector units 108A to 108C suspend transfer of information received from the first data stream 160 and information received from the second data stream 170, thus temporarily disconnecting the first data stream 160 and the second data stream 170. A device inside the external storage device 100 and an external device connected to either the first input/output unit 110 or the second input/output unit 120 detect the disconnection carried out by the configuration change notification unit 107, initialize the data streams, and output signals for checking devices connected to the data streams. The signals may be a loop initialization primitive sequences and frames on a Fibre Channel arbitrated loop. By the foregoing process, the configuration change notification unit 107 can notify the routing information storage unit 45 of information that there is the change as to which unit out of the first input/output unit 110 and the second input/output unit 120 is connected to each of the first hard disk drive 150 and the second hard disk drive 152.

The foregoing process will be described while citing a case where the second hard disk drive 152 is newly connected to the first input/output unit 110 and comes to be not connected to the second input/output unit 120 as an example. In FIG. 2, it is assumed that the selector unit 108B is set to the pass-through mode and the selector unit 108C is newly set to the loop-back mode. In this case, since the configuration change notification unit 107 is not connected to the second input/output unit 120, the configuration change notification unit 107 cannot directly communicate with an external device, such as the routing information storage unit 45, through the second input/output unit 120. Accordingly, the configuration change notification unit 107 transmits instructions to temporarily disconnect the data streams to the selector unit 108C, thus making it possible to notify the routing information storage unit 45 of information that the second hard disk drive 152 has come to be not connected the second input/output unit 120.

The first hard disk drive 150 is connected to the first data stream 160. For example, the first hard disk drive 150 is a storage device including a Fibre Channel interface. The first hard disk drive 150 writes data on itself in response to a request received through the first data stream 160. Moreover, the first hard disk drive 150 reads data from itself depending on a request received through the first data stream 160, and outputs the read data to the first data stream 160.

The second hard disk drive 152 is almost the same as the first hard disk drive 150. Therefore, a detailed description thereof will be omitted.

Figure 3:
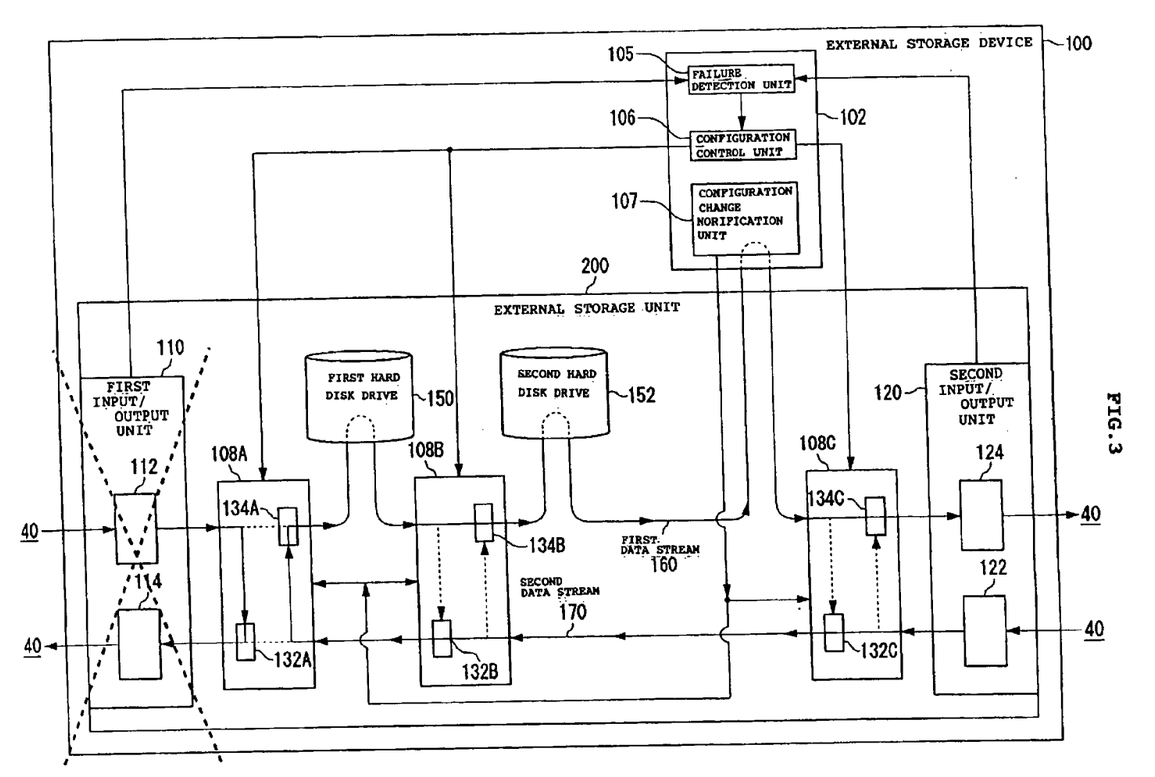
FIG. 3 is a view for explaining an operation when a first input/output unit 110 cannot be used in FIG. 2.

FIG. 3 shows an operation when the first input/output unit 110 cannot be used in FIG. 2. As an initial state, it is assumed that the selector unit 108A, the selector unit 108B, and the selector unit 108C are respectively set to the pass-through mode, the loop-back mode, and the pass-through mode. When the failure detection unit 105 detects a failure in the communications using the first input/output unit 110, the configuration control unit 106 sets the selector unit 108B to the pass-through mode and sets the selector unit 108A to the loop-back mode. Accordingly, both the first hard disk drive 150 and the second hard disk drive 152 are connected to the second input/output unit 120. In FIG. 3, a path to which the first hard disk drive 150 and the second hard disk drive 152 are connected, that is, a path from the second input/output unit 120 to the second input/output unit 120 via the first hard disk drive 150 and the second hard disk drive 152, is shown by a solid line.

Figure 4:
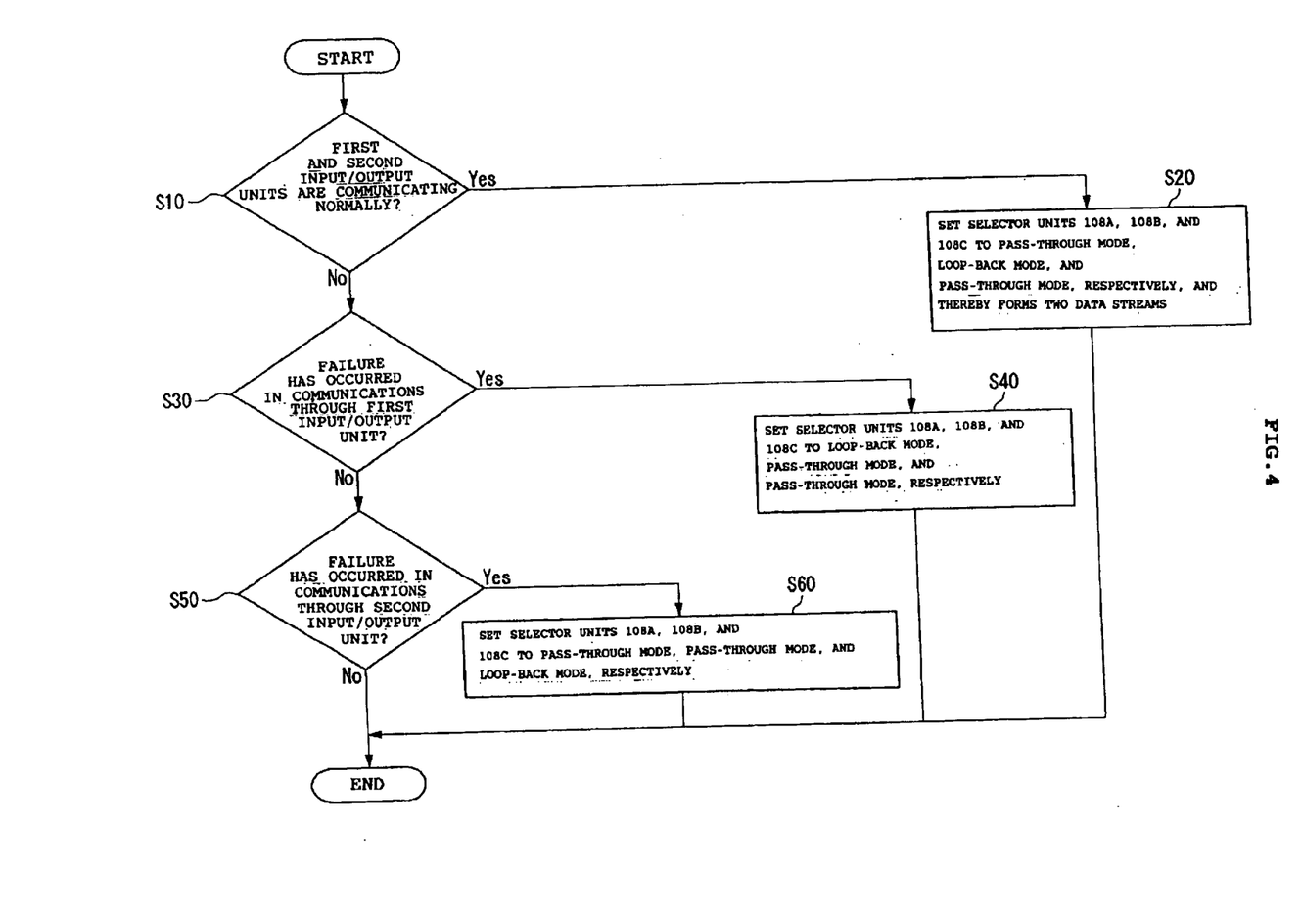
FIG. 4 is a flowchart showing an operation of a control device 102.

FIG. 4 is a flowchart showing control by the control device 102. First, the failure detection unit 105 determines whether the communications through the first input/output unit 110 and the second input/output unit 120 are normal or not (S10). When the communications through the first input/output unit 110 and the second input/output unit 120 are normal (S10: YES), the configuration control unit 106 sets the selector unit 108A, the selector unit 108B, and the selector unit 108C to the pass-through mode, the loop-back mode, and the pass-through mode, respectively. Thus the first hard disk drive 150 and the second hard disk drive 152 are connected to the first input/output unit 110 and the second input/output unit 120, respectively (S20). Next, the failure detection unit 105 determines whether a failure has occurred in the communications through the first input/output unit 110 or not (S30). When there is a failure in the communications through the first input/output unit 110 (S30: YES), the configuration control unit 106 sets the selector unit 108A, the selector unit 108B, and the selector unit 108C to the loop-back mode, the pass-through mode, and the pass-through mode, respectively (S40). Next, the failure detection unit 105 determines whether a failure has occurred in the communications through the second input/output unit 120 or not (S50). When there is a failure in the communications through the second input/output unit 120 (S50: YES), the configuration control unit 106 sets the selector unit 108A, the selector unit 108B, and the selector unit 108C to the pass-through mode, the pass-through mode, and the loop-back mode, respectively (S60). The control device 102 carries out the operation shown in FIG. 4 periodically or in the event of a failure, for example. Thus, when there is no failure in both of the first input/output unit 110 and the second input/output unit 120, the control device 102 uses both the first input/output unit 110 and the second input/output unit 120 to realize high speed communications. Meanwhile, when a failure is detected in either the first input/output unit 110 or the second input/output unit 120, the control device 102 can use the normal one between the first input/output unit 110 and the second input/output unit 120, and thereby causes both the first hard disk drive 150 and the second hard disk drive 152 to communicate with the outside.

Figure 5:
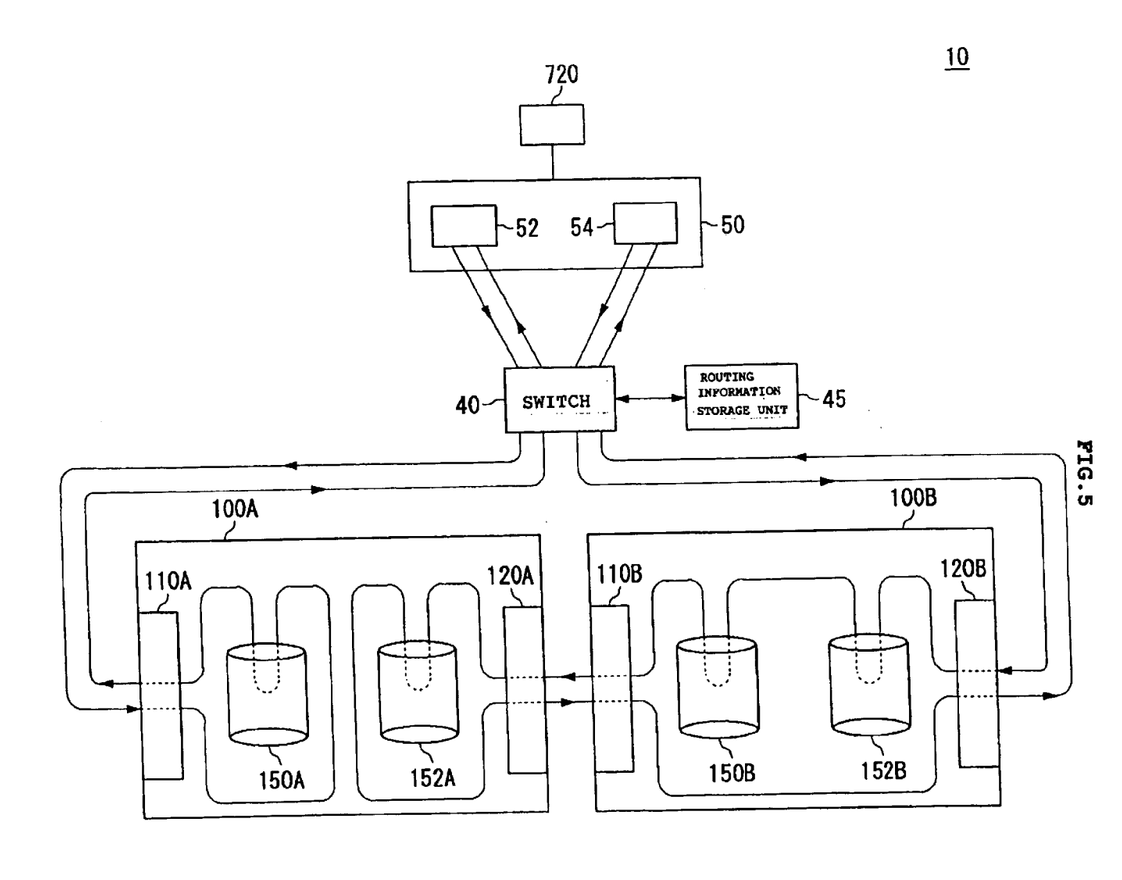
FIG. 5 is a view showing a modification of the external storage system 10.

FIG. 5 shows a modification of the external storage system 10 according to the embodiment. The external storage system 10 includes an external storage device 100A and an external storage device 100B instead of the external storage device 100 in FIG. 1. The external storage device 100A has a first input/output unit 110A, a second input/output unit 120A, a first hard disk drive 150A, and a second hard disk drive 152A. The external storage device 100B has a first input/output unit 110B, a second input/output unit 120B, a first hard disk drive 150B, and a second hard disk drive 152B.

The switch 40 is connected to the host computer 50, the first input/output unit 110A, and the second input/output unit 120B through bidirectional connections. The second input/output unit 120A is connected to the first input/output unit 110B through a bidirectional connection. The first hard disk drive 150A is connected to the first input/output unit 110A through data streams for input and output inside the external storage device 100A. Similarly, the second hard disk drive 152A is connected to the second input/output unit 120A through a bidirectional connection. Meanwhile, the first input/output unit 110B is directly connected to the second input/output unit 120B inside the external storage device 100B. Moreover, the first input/output unit 110B is connected to a path sequentially connecting the first hard disk drive 150B and the second hard disk drive 152B to reach the second input/output unit 120B.

As the example in FIG. 5, in the external storage device 100B, all hard disk drives included in the external storage device 100B may be connected so as to be provided on one data stream, unlike the external storage device 100A. Specifically, by setting all of the unillustrated selector units 108 included in the external storage device 100B are set to the pass-through mode, all hard disk drives included in the external storage device 100B are provided on one data stream. Accordingly, by connecting the external storage device 100B to a device, such as the external storage device 100A, in series, all hard disk drives of the external storage device 100B are accessed by the host computer 50 through only one data stream.

Figure 6:
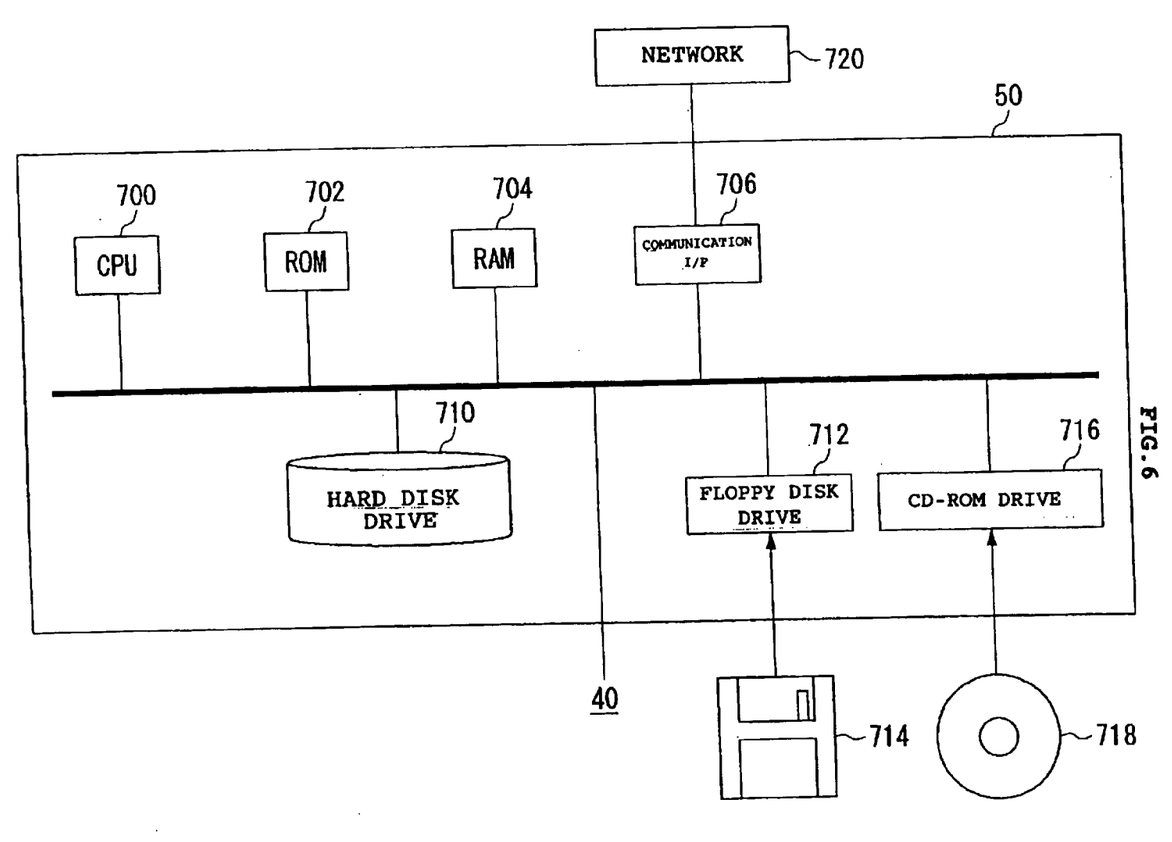
FIG. 6 is a diagram showing a hardware configuration of the host computer 50 according to an embodiment of the present invention.

FIG. 6 shows an example of a hardware configuration of the host computer 50 according to the embodiment of the present invention. The host computer 50 includes a CPU 700, a ROM 702, a RAM 704, a communication interface (communication I/F) 706, and a hard disk drive 710. The host computer 50 may further include a floppy disk drive 712 and/or a CD-ROM drive 716. The host computer 50 loads a program received from the outside to the control device 102.

The control device 102 has a configuration in which the ROM 702, the communication I/F 706, the hard disk drive 710, the floppy disk drive 712, and the CD-ROM drive 716 are removed from the configuration shown in FIG. 6. Functions of the configuration change notification unit 107, the failure detection unit 105, and the configuration control unit 106 in the control device 102 shown in FIG. 2 are realized by coordination among a CPU in the control device 102, a RAM therein, and the program received from the host computer 50, which is executed on the control device 102. The program realizing the configuration change notification unit 107, the failure detection unit 105, and the configuration control unit 106 includes a configuration change notification module, a failure detection module, and a configuration control module. The program is loaded from the outside by the host computer 50, and transmitted to the control device 102. The control device 102 stores the program on the unillustrated ROM and RAM. These modules are programs causing the control device 102 to operate as the configuration change notification unit 107, the failure detection unit 105, and the configuration control unit 106, respectively.

The above described programs or modules may be stored on an external storage medium.

As the storage medium, an optical recording medium such as a DVD or a PD, a magneto optical recording medium such as an MD, a tape medium, a semiconductor memory such as an IC card, or the like may be used besides a floppy disk 714 and a CD-ROM 718. Alternatively, a storage device such as a hard disk or a RAM, which is provided in a server system connected to a private communication network or the Internet, may be used as the storage medium to provide the program to the host computer 50 through the network 720.

Although the present invention has been described by using the embodiment thereof, the technical scope of the present invention is not limited to the scope described in the embodiment above. Many changes and modifications can be made to the above described embodiment. It will be evident from the appended claims that the changed or modified modes may also be included in the technical scope of the present invention.

According to the above described embodiment, realized are an external storage device, a control device, an external storage system, a control method, a program, and a recording medium.

Based on the foregoing description, in a first aspect this invention provides an external storage device that includes first and second input/output units for performing input/output of information from/to an an external unit; a plurality of storage units connected between the first input/output unit and the second input/output unit so that a transmission path of information forms a series connection; and a configuration control unit for selecting two adjacent units from the first input/output unit, each of the plurality of storage units, and the second input/output unit to set a boundary between the two adjacent units, thus causing the storage units located on a first input/output unit side of the boundary to communicate with the an external unit by using the first input/output unit and causing the storage units located on a second input/output unit side of the boundary to communicate with the an external unit by using the second input/output unit.

Related to the first aspect, there is a first data stream from an input port of the first input/output unit to an output port of the second input/output unit going through the plurality of storage units sequentially; a second data stream connecting an input port of the second input/output unit and an output port of the first input/output unit; a plurality of first selectors provided on the second data stream, the first selectors obtaining information transmitted to respective positions between two adjacent units out of the first input/output unit, each of the plurality of storage units, and the second input/output unit on the first data stream and selecting between turning back the obtained information to the second data stream and transmitting the information transmitted to the second data stream without change by instructions of the configuration control unit; and a plurality of second selectors provided at positions closer to the second input/output unit than positions where the respective first selectors obtain the information between two adjacent units out of the first input/output unit, each of the plurality of storage units, and the second input/output unit so as to correspond to the respective first selectors, the second selectors selecting between turning back information transmitting on the second data stream closer to the second input/output unit than the respective first selectors to transmit the information to the first data stream and transmitting information transmitted to the first data stream without change by instructions of the configuration control unit.

Related to the first aspect, there is a failure detection unit for detecting failures in communications with the external unit through the first input/output unit and in communications with the external unit through the second input/output unit, wherein the configuration control unit sets the boundary between two adjacent storage units out of the storage units when the failures are not detected, and thus the configuration control unit causes the storage units located on the first input/output unit side of the boundary to communicate with the external unit by using the first input/output unit and causes the storage units located on the second input/output unit side of the boundary to communicate with the external unit by using the second input/output unit.

Related to the first aspect, the configuration control unit sets the boundary between the first input/output unit and the plurality of storage units when the failure detection unit detects the failure in the communications with the external unit through the first input/output unit, and thus the configuration control unit causes each of the plurality of storage units to communicate with the external unit by using the second input/output unit.

Related to the first aspect, the configuration control unit sets the boundary between the second input/output unit and the plurality of storage units when the failure detection unit detects the failure in the communications with the external unit through the second input/output unit, and thus the configuration control unit causes each of the plurality of storage units to communicate with the external unit by using the first input/output unit.

Related to the first aspect, there is a configuration change notification unit for notifying the external unit of information that a combination of the storage units for communicating with the external unit by using any one of the first input/output unit and the second input/output unit is changed when the combination of the storage units for communicating with the external unit by using any one of the first input/output unit and the second input/output unit is changed.

Related to the first aspect, there is a configuration change notification unit for temporarily disconnecting the communications using the first input/output unit and the second input/output unit when a combination of the plurality of storage units for communicating with the external unit by using any one of the first input/output unit and the second input/output unit is changed.

Based on the foregoing description, in a second aspect this invention provides an external storage device that includes first and second input/output units performing input/output of information from/to an external unit and a plurality of storage units connected between the first input/output unit and the second input/output unit so that a transmission path of information forms a series connection, the control device comprising: a failure detection unit for detecting failures in communications with the external unit through the first input/output unit and in communications with the external unit through the second input/output unit; and a configuration control unit for setting a boundary between two adjacent storage units out of the storage units to cause the storage units located on a first input/output unit side of the boundary to communicate with the external unit by using the first input/output unit and to cause the storage units located on a second input/output unit side of the boundary to communicate with the external unit by using the second input/output unit when the failures are not detected, the configuration control unit causing each of the plurality of storage units to communicate with the external unit by using the second input/output unit when the failure is detected in the communications with the external unit through the first input/output unit.

Related to the second aspect, there is a configuration change notification unit for notifying the external unit of information that a combination of the storage units for communicating with the external unit by using any one of the first input/output unit and the second input/output unit is changed when the combination of the storage units for communicating with the external unit by using any one of the first input/output unit and the second input/output unit is changed.

Related to the second aspect, there is a configuration change notification unit for temporarily disconnecting the communications using the first input/output unit and the second input/output unit when a combination of the plurality of storage units for communicating with the external unit by using any one of the first input/output unit and the second input/output unit is changed.

Based on the foregoing description, in a third aspect this invention provides an external storage system that includes a host computer; an external storage device including first and second input/output units for performing input/output of information, the first and second input/output units being connected to the host computer, a plurality of storage units connected between the first input/output unit and the second input/output unit so that a transmission path of information forms a series connection, and a configuration control unit for setting a boundary between any two adjacent units out of the first input/output unit, each of the plurality of storage units, and the second input/output unit to cause the storage units located on a first input/output unit side of the boundary to communicate with an external unit by using the first input/output unit and to cause the storage units located on a second input/output unit side of the boundary to communicate with the external unit by using the second input/output unit; and a routing information storage unit for storing routing information showing as to which of the first input/output unit and the second input/output unit each storage unit is connected to in the external storage device, wherein the host computer uses any one of the first input/output unit and the second input/output unit, which is specified based on the routing information stored in the routing information storage unit, when the host computer accesses one storage unit out of the storage units.

Related to the third aspect, there is a failure detection unit for detecting failures in communications with the host computer through the first input/output unit and in communications with the host computer through the second input/output unit, wherein the configuration control unit sets the boundary between the one storage unit and a storage unit out of the storage units adjacent to the one storage unit when the failures are not detected, and thus the configuration control unit causes the storage units located on the first input/output unit side of the boundary to communicate with the external unit by using the first input/output unit and causes the storage units located on the second input/output unit side of the boundary to communicate with the external unit by using the second input/output unit.

Related to the third aspect, the configuration control unit sets the boundary between the first input/output unit and the plurality of storage units when the failure detection unit detects the failure in the communications with the external unit through the first input/output unit, and thus the configuration control unit causes each of the plurality of storage units to communicate by using the second input/output unit.

Related to the third aspect, there is a configuration change notification unit for notifying the external unit of the external storage device of information that a combination of the storage units for communicating with the host computer by using any one of the first input/output unit and the second input/output unit is changed when the combination of the storage units for communicating with the host computer by using any one of the first input/output unit and the second input/output unit is changed.

Related to the third aspect, there is a configuration change notification unit for temporarily disconnecting the communications with the host computer using the first input/output unit and the second input/output unit when a combination of the plurality of storage units for communicating with the host computer by using any one of the first input/output unit and the second input/output unit is changed.

Based on the foregoing description, in a fourth aspect this invention provides a control method to control an external storage device that includes first and second input/output units for performing input/output of information from/to an external unit and a plurality of storage units connected between the first input/output unit and the second input/output unit so that a transmission path of information forms a series connection, the control method includes detecting failures in communications with the external unit through the first input/output unit and in communications with the external unit through the second input/output unit; setting a boundary between two adjacent storage units out of the storage units when the failures in the communications are not detected, thus causing the storage units located on a first input/output unit side of the boundary to communicate with the external unit by using the first input/output unit and causing the storage units located on a second input/output unit side of the boundary to communicate with the external unit by using the second input/output unit; and causing each of the plurality of storage units to communicate with the external unit by using the second input/output unit when a failure is detected in the communications with the external unit through the first input/output unit.

Based on the foregoing description, in a further aspect this invention provides a program for causing a computer to control an external storage device which includes first and second input/output units for performing input/output of information from/to an external unit and a plurality of storage units connected between the first input/output unit and the second input/output unit so that a transmission path of information forms a series connection, the program includes modules for causing the computer to detect failures in communications with the external unit through the first input/output unit and in communications with the external unit through the second input/output unit; causing the computer to set a boundary between two adjacent storage units out of the storage units when the failures in the communications are not detected, thus causing the computer to allow the storage units located on a first input/output unit side of the boundary to communicate with the external unit by using the first input/output unit and to allow the storage units located on a second input/output unit side of the boundary to communicate with the external unit by using the second input/output unit; and causing the computer to allow each of the plurality of storage units to communicate with the external unit by using the second input/output unit when a failure is detected in the communications with the external unit through the first input/output unit.

Based on the foregoing description, in a still further aspect this invention provides a recording medium on which a program is recorded, the program causing a computer to control an external storage device which includes first and second input/output units for performing input/output of information from/to an external unit and a plurality of storage units connected between the first input/output unit and the second input/output unit so that a transmission path of information forms a series connection, wherein the program includes modules for causing the computer to detect failures in communications with the external unit through the first input/output unit and in communications with the external unit through the second input/output unit; causing the computer to set a boundary between two adjacent storage units out of the storage units when the failures in the communications are not detected, thus causing the computer to allow the storage units located on a first input/output unit side of the boundary to communicate with the external unit by using the first input/output unit and to allow the storage units located on a second input/output unit side of the boundary to communicate with the external unit by using the second input/output unit; and causing the computer to allow each of the plurality of storage units to communicate with the external unit by using the second input/output unit when a failure is detected in the communications with the external unit through the first input/output unit.

As evident from the description above, according to the present invention, it is possible to provide an external storage device and the like, which communicates at high speed and recovers communications in the event of a failure.

Although the preferred embodiment of the present invention has been described in detail, it should be understood that various changes, substitutions and alternations can be made therein without departing from spirit and scope of the inventions as defined by the appended claims.

What is claimed is:

1. An external storage device comprising:
   first and second input/output units for performing input/output of information from/to at least one unit external to said device;
   a plurality of storage units connected between the first input/output unit and the second input/output unit so that a transmission path of information forms a series connection; and
   a configuration control unit for selecting two adjacent units from the first input/output unit, each of the plurality of storage units, and the second input/output unit so as to set a boundary between the two adjacent units, thus causing the storage units located on a first input/output unit side of the boundary to communicate with the at least one unit external to said device by using the first input/output unit and causing the storage units located on a second input/output unit side of the boundary to communicate with the at least one unit external to said device by using the second input/output unit, further comprising a configuration change notification unit for initiating the notification, via at least one of said first and second input/output units, of the at least one unit external to said storage device of a change in a configuration state, due to setting the boundary, of said storage device.

2. The external storage device according to claim 1, further comprising:
   a first data stream from an input port of the first input/output unit to an output port of the second input/output unit going through the plurality of storage units sequentially;
   a second data stream connecting an input port of the second input/output unit and an output port of the first input/output unit;
   a plurality of first selectors provided on the second data stream, the first selectors obtaining information transmitted to respective positions between two adjacent units out of the first input/output unit, each of the plurality of storage units, and the second input/output unit on the first data stream and selecting between turning back the obtained information to the second data stream and transmitting the information transmitted to the second data stream without change by instructions of the configuration control unit; and
   a plurality of second selectors provided at positions closer to the second input/output unit than positions where the respective first selectors obtain the information between two adjacent units out of the first input/output unit, each of the plurality of storage units, and the second input/output unit so as to correspond to the respective first selectors, the second selectors selecting between turning back information transmitting on the second data stream closer to the second input/output unit than the respective first selectors to transmit the information to the first data stream and transmitting information transmitted to the first data stream without change by instructions of the configuration control unit.

3. The external storage device according to claim 1, further comprising:
   a failure detection unit for detecting failures in communications with the at least one unit external to said device through the first input/output unit and in communications with the at least one unit external to said device through the second input/output unit,
   wherein the configuration control unit sets the boundary between two adjacent storage units out of the plurality of storage units when the failures are not detected, and thus the configuration control unit causes the storage units located on the first input/output unit side of the boundary to communicate with the at least one unit external to said device by using the first input/output unit and causes the storage units located on the second input/output unit side of the boundary to communicate with the at least one unit external to said device by using the second input/output unit.

4. The external storage device according to claim 3, wherein the configuration control unit sets the boundary between the first input/output unit and the plurality of storage units when the failure detection unit detects the failure in the communications with the at least one unit external to said device through the first input/output unit, and thus the configuration control unit causes each of the plurality of storage units to communicate with the at least one unit external to said device by using the second input/output unit.

5. The external storage device according to claim 4, wherein the configuration control unit sets the boundary between the second input/output unit and the plurality of storage units when the failure detection unit detects the failure in the communications with the at least one unit external to said device through the second input/output unit, and thus the configuration control unit causes each of the plurality of storage units to communicate with the at least one unit external to said device by using the first input/output unit.

6. The external storage device according to claim 3, where said configuration change notification unit notifies the at least one unit external to said device of information that a combination of the storage units for communicating with the at least one external unit by using any one of the first input/output unit and the second input/output unit is changed, when the combination of the storage units for communicating with the at least one unit external to said device by using any one of the first input/output unit and the second input/output unit is changed.

7. The external storage device according to claim 3, where said configuration change notification unit temporarily disconnects communications using the first input/output unit and the second input/output unit when a combination of the plurality of storage units for communicating with the at least one unit external to said device, by using any one of the first input/output unit and the second input/output unit, is changed.

8. A control device for controlling an external storage device which includes first and second input/output units performing input/output of information from/to at least one unit external to said storage device and a plurality of storage units connected between the first input/output unit and the second input/output unit so that a transmission path of information forms a series connection, the control device comprising:

a failure detection unit for detecting failures in communications with the at least one unit external to said storage device through the first input/output unit and in communications with the at least one unit external to said storage device through the second input/output unit; and a configuration control unit for setting a boundary between two adjacent storage units out of the plurality of storage units to cause the storage units located on a first input/output unit side of the boundary to communicate with the at least one unit external to said storage device by using the first input/output unit and to cause the storage units located on a second input/output unit side of the boundary to communicate with the at least one unit external to said storage device by using the second input/output unit when the failures are not detected, the configuration control unit causing each of the plurality of storage units to communicate with the at least one unit external to said storage device by using the second input/output unit when the failure is detected in the communications with the at least one unit external to said storage device through the first input/output unit, further comprising a configuration change notification unit for initiating the notification, via at least one of said first and second input/output units, of the at least one unit external to said storage device of a change in a configuration state, due to setting the boundary, of said storage device.

9. The control device according to claim 8, where said configuration change notification unit notifies the at least one unit external to said storage device of information that a combination of the storage units for communicating with the at least one unit external to said storage device by using any one of the first input/output unit and the second input/output unit is changed, when the combination of the storage units for communicating with the at least one unit external to said storage device by using any one of the first input/output unit and the second input/output unit is changed.

10. The control device according to claim 8, where said configuration change notification unit temporarily disconnects communications using the first input/output unit and the second input/output unit when a combination of the plurality of storage units for communicating with the at least one unit external to said storage device, by using any one of the first input/output unit and the second input/output unit, is changed.

11. An external storage system comprising:

a host computer;

an external storage device including first and second input/output units for performing input/output of information, the first and second input/output units being connected to the host computer, a plurality of storage units connected between the first input/output unit and the second input/output unit so that a transmission path of information forms a series connection, and a configuration control unit for setting a boundary between any two adjacent units out of the first input/output unit, each of the plurality of storage units, and the second input/output unit to cause the storage units located on a first input/output unit side of the boundary to communicate with the host computer by using the first input/output unit and to cause the storage units located on a second input/output unit side of the boundary to communicate with the host computer by using the second input/output unit; and a routing information storage unit for storing routing information showing as to which of the first input/output unit and the second input/output unit each storage unit is connected to in the external storage device, wherein the host computer uses any one of the first input/output unit and the second input/output unit, which is specified based on the routing information stored in the routing information storage unit, when the host computer accesses one storage unit out of the plurality of storage units, further comprising a configuration change notification unit for initiating the notification, via at least one of said first and second input/output units, of at least the routing information storage unit of a change in a configuration state, due to setting the boundary, of said storage device.

12. The external storage system according to claim 11, further comprising:

a failure detection unit for detecting failures in communications with the host computer through the first input/output unit and in communications with the host computer through the second input/output unit, wherein the configuration control unit sets the boundary between the one storage unit and a storage unit out of the plurality of storage units adjacent to the one storage unit when the failures are not detected, and thus the configuration control unit causes the storage units located on the first input/output unit side of the boundary to communicate with the host computer by using the first input/output unit and causes the storage units located on the second input/output unit side of the boundary to communicate with the host computer by using the second input/output unit.

13. The external storage system according to claim 12, wherein the configuration control unit sets the boundary between the first input/output unit and the plurality of storage units when the failure detection unit detects the failure in the communications with the host computer through the first input/output unit, and thus the configuration control unit causes each of the plurality of storage units to communicate by using the second input/output unit.

14. The external storage system according to claim 12, where said configuration change notification unit notifies at least the routing information storage unit of information that a combination of the storage units for communicating with the host computer by using any one of the first input/output unit and the second input/output unit is changed, when the combination of the storage units for communicating with the host computer by using any one of the first input/output unit and the second input/output unit is changed.

15. The external storage system according to claim 12, where said configuration change notification unit temporarily disconnects communications with the host computer using the first input/output unit and the second input/output unit when a combination of the plurality of storage units for communicating with the host computer, by using any one of the first input/output unit and the second input/output unit, is changed.

16. A control method of controlling an external storage device which includes first and second input/output units for performing input/output of information from/to at least one unit external to said device and a plurality of storage units connected between the first input/output unit and the second input/output unit so that a transmission path of information forms a series connection, the control method comprising the steps of:

detecting failures in communications with the at least one unit external to said device through the first input/output unit and in communications with the at least one unit external to said device through the second input/output unit;

setting a boundary between two adjacent storage units out of the plurality of storage units when the failures in the communications are not detected, thus causing the storage units located on a first input/output unit side of the boundary to communicate with the at least one unit external to said device by using the first input/output unit and causing the storage units located on a second input/output unit side of the boundary to communicate with the at least one unit external to said device by using the second input/output unit; and causing each of the plurality of storage units to communicate with the at least one unit external to said device by using the second input/output unit when a failure is detected in the communications with the at least one unit external to said device through the first input/output unit;

further comprising notifying, via at least one of said first and second input/output units, the at least one unit external to said device of a change in a configuration state of said storage device due to the detection of the failure in communications.

17. A program for causing a computer to control an external storage device which includes first and second input/output units for performing input/output of information from/to at least one unit external to said device and a plurality of storage units connected between the first input/output unit and the second input/output unit so that a transmission path of information forms a series connection, the program comprising the modules of:

causing the computer to detect failures in communications with the at least one unit external to said device through the first input/output unit and in communications with the at least one unit external to said device through the second input/output unit;

causing the computer to set a boundary between two adjacent storage units out of the plurality of storage units when the failures in the communications are not detected, thus causing the computer to allow the storage units located on a first input/output unit side of the boundary to communicate with the at least one unit external to said device by using the first input/output unit and to allow the storage units located on a second input/output unit side of the boundary to communicate with the at least one unit external to said device by using the second input/output unit; and causing the computer to allow each of the plurality of storage units to communicate with the at least one unit external to said device by using the second input/output unit when a failure is detected in the communications with the at least one unit external to said device through the first input/output unit;

further comprising notifying, via at least one of said first and second input/output units, the at least one unit external to said device of a change in a configuration state of said storage device due to the detection of the failure in communications.

18. A recording medium on which a program is recorded, the program causing a computer to control an external storage device which includes first and second input/output units for performing input/output of information from/to at least one unit external to said device and a plurality of storage units connected between the first input/output unit and the second input/output unit so that a transmission path of information forms a series connection, wherein the program comprises the modules of:

causing the computer to detect failures in communications with the at least one unit external to said device through the first input/output unit and in communications with the at least one unit external to said device through the second input/output unit;

causing the computer to set a boundary between two adjacent storage units out of the plurality of storage units when the failures in the communications are not detected, thus causing the computer to allow the storage units located on a first input/output unit side of the boundary to communicate with the at least one unit external to said device by using the first input/output unit and to allow the storage units located on a second input/output unit side of the boundary to communicate with the at least one unit external to said device by using the second input/output unit; and causing the computer to allow each of the plurality of storage units to communicate with the at least one unit external to said device by using the second input/output unit when a failure is detected in the communications with the at least one unit external to said device through the first input/output unit;

further comprising notifying, via at least one of said first and second input/output units, the at least one unit external to said device of a change in a configuration state of said storage device due to the detection of the failure in communications.

19. A data storage unit, comprising:

a first input/output (I/O) port;

a second I/O port;

a first data storage unit;

a second data storage unit;

first data path means switchably coupled between said first I/O port and said first data storage unit;

second data path means switchably coupled between said second I/O port and said second data storage unit;

third data path means switchably coupled between said first data storage unit and said second data storage unit;

said first, second and third data path means each being switchable between a pass-through mode of operation and a loop-back mode of operation; and configuration control means having outputs coupled to said first, second and third data path means for selecting one of the pass-through or the loop-back modes of operation of each of said first, second and third data path means for setting a configuration state of said data storage unit, said configuration control means operating in response to an operational/failure state of at least said first I/O port and said second I/O port for controlling said first, second and third data path means so as to one of (a) couple said first I/O port to said first data storage unit and said second I/O port to said second data storage unit; (b) couple said first I/O port to both said first and said second data storage unit; or (c) couple said second I/O port to both said first and said second data storage unit, further comprising configuration notification means for initiating the notification, via at least one of said first and second I/O ports, of a unit external to said data storage unit of a change in the configuration state of said data storage unit.

20. A data storage unit as in claim 19, where said unit external to said data storage unit comprises a routine information storage unit that is one of: (a) part of a host computer and (b) separate from the host computer, said routing information storage unit being coupled to said data storage unit via a switch.

* * * * *

UNITED STATES PATENT AND TRADEMARK OFFICE
CERTIFICATE OF CORRECTION

| | |
|---|---|
| PATENT NO. | : 6,845,411 B2 |
| DATED | : January 18, 2005 |
| INVENTOR(S) | : Takeshi Ishimoto and Tohru Sumiyoshi |

It is certified that error appears in the above-identified patent and that said Letters Patent is hereby corrected as shown below:

<u>Column 18,</u>
Line 61, "routine" should be deleted and -- routing -- should be inserted.

Signed and Sealed this

Twelfth Day of April, 2005

JON W. DUDAS
*Director of the United States Patent and Trademark Office*